June 5, 1934.  R. S. SANFORD  1,961,831

BRAKE

Filed March 7, 1931

INVENTOR.
ROY S. SANFORD
BY O. H. Fowler
ATTORNEY

Patented June 5, 1934

1,961,831

UNITED STATES PATENT OFFICE 1,961,831

BRAKE

Roy S. Sanford, South Bend, Ind., assignor to Bendix Brake Company, South Bend, Ind., a corporation of Illinois Application March 7, 1931, Serial No. 520,799

10 Claims. (Cl. 188—140)

This invention relates to brakes and more particularly to brakes for motor vehicles.

Broadly the invention comprehends means for automatically applying the brakes of a motor vehicle upon deceleration of the vehicle, caused by applying either a set of rear brakes or a transmission brake on the vehicle.

An object of the invention is to provide a simple and effective brake for a motor vehicle operable automatically upon deceleration of the vehicle.

Another object of the invention is to provide means for effectively applying the brakes on the wheels of a motor vehicle uniformly and concomitantly upon deceleration of the vehicle, the application being in proportion to the deceleration of the vehicle.

A further object of the invention is to provide brakes for the front wheels of a motor vehicle operable automatically upon deceleration of the vehicle with an applied force proportionate to the deceleration and releasable in proportion to the steering angle.

Other objects of the invention will appear from the following description taken in connection with the drawing, which forms a part of this specification, and in which.

Figure 1:
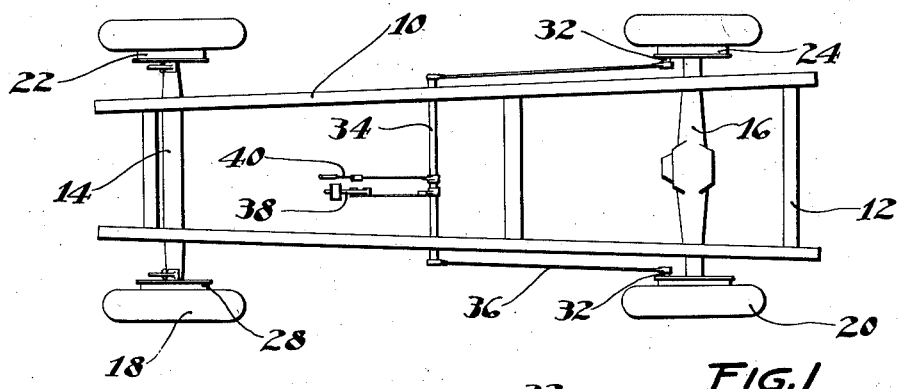
Figure 1 is a top plan view of a motor vehicle chassis illustrating one embodiment of the invention.
Figure 2:
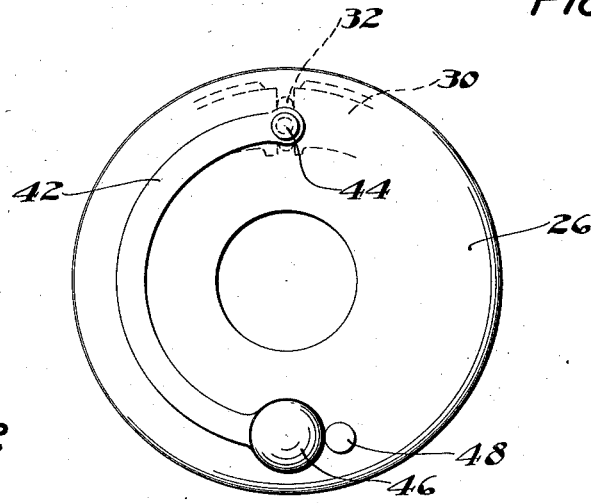
Figure 2 is a side elevation of the brake illustrating the invention as applied.

Referring to the drawing for more specific details of the invention, 10 represents the side rails of a motor vehicle chassis frame connected by spaced cross-bars 12. The frame is supported on a front axle 14 and a rear axle 16 by conventional springs, not shown, and positioned on the axles 14 and 16 are front wheels 18 and rear wheels 20.

The wheels 18 and 20 are equipped with front wheel brakes 22 and rear wheel brakes 24. As shown, the brakes are of a conventional type including a backing plate 26 having associated therewith a rotatable drum 28 suitably secured to the wheel, and a friction element 30 on the backing plate for cooperation with the braking surface of the drum with an operating cam 32 between the separable ends of the friction element.

In one embodiment of the invention the rear brakes 24 are operated by a conventional hook-up including a cross-shaft 34 positioned for rotation on the frame and suitably connected to the operating cams through pull rods 36. As shown, the shaft 34 may be rocked to apply the brakes by a foot pedal lever 38 or hand lever 40 suitably supported on the chassis, preferably on the transmission casing.

The front wheel brakes 22 are independently yet concomitantly operated through depending levers 42 suitably secured to the operating shafts 44 for the cams. As shown, the lever 42 is arcuate and is provided upon its free ends with a mass 46 engaging a stop 48 on the backing plate when the brake is in the off position. The levers 42 are preferably semi-circular and are provided upon their free ends with a ball. This provides a clearance for the axle supporting the wheel and associated brake. The lever is so secured to the cam 32 that the axis of the cam and the axis of the ball or mass 46 are in a perpendicular plane through the axis of the brake structure, when the brake is in the off position, so that movement of the mass actuates the cam to effectively engage the friction element 30 with the braking surface of the drum.

Figure 3:
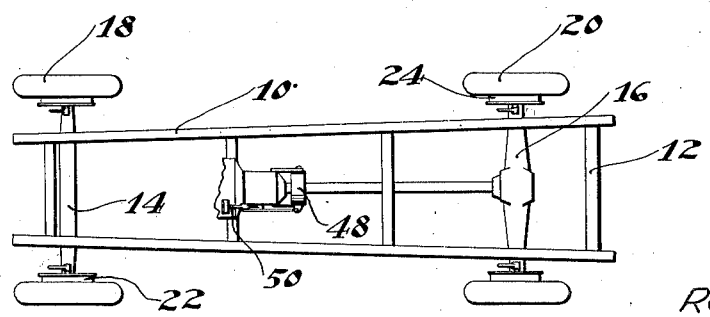
Figure 3 is a top plan view of a motor vehicle chassis illustrating another embodiment of the invention.

Another embodiment of the invention is illustrated in Figure 3, wherein each wheel of the vehicle is equipped with a brake-actuating means including a depending lever suitably secured to the operating cams 32 and weighted at its free end. In this embodiment of the invention deceleration of the vehicle may be caused by a transmission brake 48, which may be of any conventional type operable through a foot lever 50 mounted on a suitable support.

In operation, deceleration of the motor vehicle may be caused by either a conventional hook-up for the rear brakes or through a conventional transmission brake.

In instances where deceleration of the vehicle is caused by an application of brakes on the rear wheels, the brakes on the front wheels will be simultaneously and concomitantly applied in proportion to the deceleration of the vehicle and the weight of the mass 46 on the lever 42: it is, of course, understood that the applied force is affected to a greater or lesser degree by the steering angle of the individual wheels.

It is clear that could the steering wheels be turned through an angle of 90 degrees deceleration of the automobile would not be effective to move the lever 42 and the weight 46, the force of momentum then acting perpendicularly to the plane of movement of the lever. If the wheels are turned through a lesser angle the effect of deceleration upon the lever and weight is decreased according to the angle through which the wheels have been turned. Thus it is clear that the applied force is affected by the steering angle of the individual wheels.

In the embodiment where deceleration of the vehicle is caused by an application of the transmission brake, the brakes on all of the wheels of the vehicle are simultaneously and concomitantly operated, the applied force depending upon the degree of deceleration of the vehicle, the weight of the mass on the respective operating levers and the steering angle of the individual wheels.

In both embodiments of the invention release of the brakes is effected through decrease in momentum of the vehicle resulting in the swinging of the weights to their normal position. This is in proportion to the degree of deceleration and the steering angle of the respective wheels.

While preferred embodiments of the invention have been described, it is to be understood that these are given merely as examples of the underlying principles and since these may be incorporated in other specific mechanical structures, I do not intend to be limited by those shown except as such limitations are clearly imposed by the appended claims.

Having thus described the various features of the invention, what I claim as new and desire to secure by Letters Patent is:

1. A brake for a motor vehicle including foot pedal operated means for decelerating the vehicle and a separate means for applying brakes by deceleration of the vehicle.

2. A brake comprising a fixed support, a rotatable drum associated therewith, friction elements on the support for cooperation with the drum, an operating cam on the fixed support between separable ends of the friction elements, a lever secured to the operating cam and a mass on the free end of the lever.

3. A brake for a motor vehicle comprising friction elements, a cam for operating the elements, an operating lever connected to the cam and a mass on the free end of the lever movable upon deceleration of the vehicle to apply the friction elements.

4. A vehicle having driver-controlled rear brakes, and front brakes having self-contained applying means actuated by changes in vehicle movement due to operation of the rear brakes.

5. A vehicle having braking means without operating connections and including applying means at the brake actuated by deceleration of the vehicle.

6. A vehicle provided with wheels having brakes associated therewith, together with an automatic applying device for each of said brakes entirely arranged adjacent the corresponding brake, together with driver-controlled means not connected to said brakes or said devices and controlling the operation of the brakes by said devices.

7. A vehicle provided with brakes, together with an automatic applying device for each of said brakes, together with driver-controlled means not connected to said brakes or said devices and controlling the operation of the brakes by said devices.

8. A vehicle having deceleration-controlled braking means, and provided with means for preventing acceleration of the vehicle from affecting the brakes.

9. A vehicle having swiveled steering wheels provided with brakes having applying means actuated by deceleration of the vehicle with a force which is a function of the steering angle of the wheels.

10. A brake for a motor vehicle including means positioned within the wheel for applying the brake by deceleration of the vehicle.

ROY S. SANFORD.